(12) United States Patent
Brette et al.

(10) Patent No.: US 8,027,970 B1
(45) Date of Patent: Sep. 27, 2011

(54) QUERY TRANSLATION FOR SEARCHING COMPLEX STRUCTURES OF OBJECTS

(75) Inventors: Marc Brette, Domène (FR); Frédéric Ciminera, Meylan (FR); Bruno Marquié, St. Martin d'Hères (FR)

(73) Assignee: EMC Corporation, Hopkinton, MA (US)

(*) Notice: Subject to any disclaimer, the term of this patent is extended or adjusted under 35 U.S.C. 154(b) by 573 days.

(21) Appl. No.: 11/644,341

(22) Filed: Dec. 22, 2006

(51) Int. Cl.
*G06F 17/30* (2006.01)
(52) U.S. Cl. .................. 707/713; 707/760
(58) Field of Classification Search ........... 707/100, 707/1, 713, 760
See application file for complete search history.

(56) References Cited

U.S. PATENT DOCUMENTS

| | | | |
|---|---|---|---|
| 5,802,518 A * | 9/1998 | Karaev et al. | 1/1 |
| 2003/0233618 A1* | 12/2003 | Wan | 715/513 |
| 2006/0149712 A1* | 7/2006 | Kindsvogel et al. | 707/3 |

* cited by examiner

*Primary Examiner* — James Trujillo
*Assistant Examiner* — Amresh Singh
(74) *Attorney, Agent, or Firm* — Van Pelt, Yi & James LLP

(57) ABSTRACT

Searching stored content is disclosed. A first mapping is created from an object to one or more stored relational database tables. A second mapping is created from the object to an indexer schema. One or both of the following is done: 1) using the first mapping to translate a search request expressed in an abstract query language to a first query language associated with the relational database; and 2) using the second mapping to translate the search request to a second query language associated with the indexer schema.

23 Claims, 8 Drawing Sheets

QUERY TRANSLATION FOR SEARCHING COMPLEX STRUCTURES OF OBJECTS

BACKGROUND OF THE INVENTION

Data associated with an object can be stored in a content management system along with links to associated objects and metadata associated with the object. For example, an email is stored in the system along with links to attachments, routing data, appended comments, etc. There may be multiple types of objects. Searching of objects depends in some systems on the type of the object—for example, a full text index may be available to search email message body content but not attachments and/or appended comments, which may be searchable only using metadata stored in a relational database. In addition, content stored in a content management system may include complex objects that include multiple objects of different types and the relations between each of the multiple objects. Since each type of object has different searching requirements that are matched to the type, searching of a complex object is not easily performed. It would be useful to be able to easily search across multiple types of objects and to be able to search across objects of different types within a complex object.

SUMMARY OF THE INVENTION

The present invention relates to searching stored content. In one embodiment, a first mapping is created from an object to one or more stored relational database tables. A second mapping is also created from the object to an indexer schema. The first mapping may be used to translate a search request expressed in an abstract query language to a first query language associated with the relational database. Either alternatively or in conjunction with the first translation, a second mapping may be used to translate the search request to a second query language associated with the indexer schema.

BRIEF DESCRIPTION OF THE DRAWINGS

Various embodiments of the invention are disclosed in the following detailed description and the accompanying drawings.

DETAILED DESCRIPTION

Figure 1:
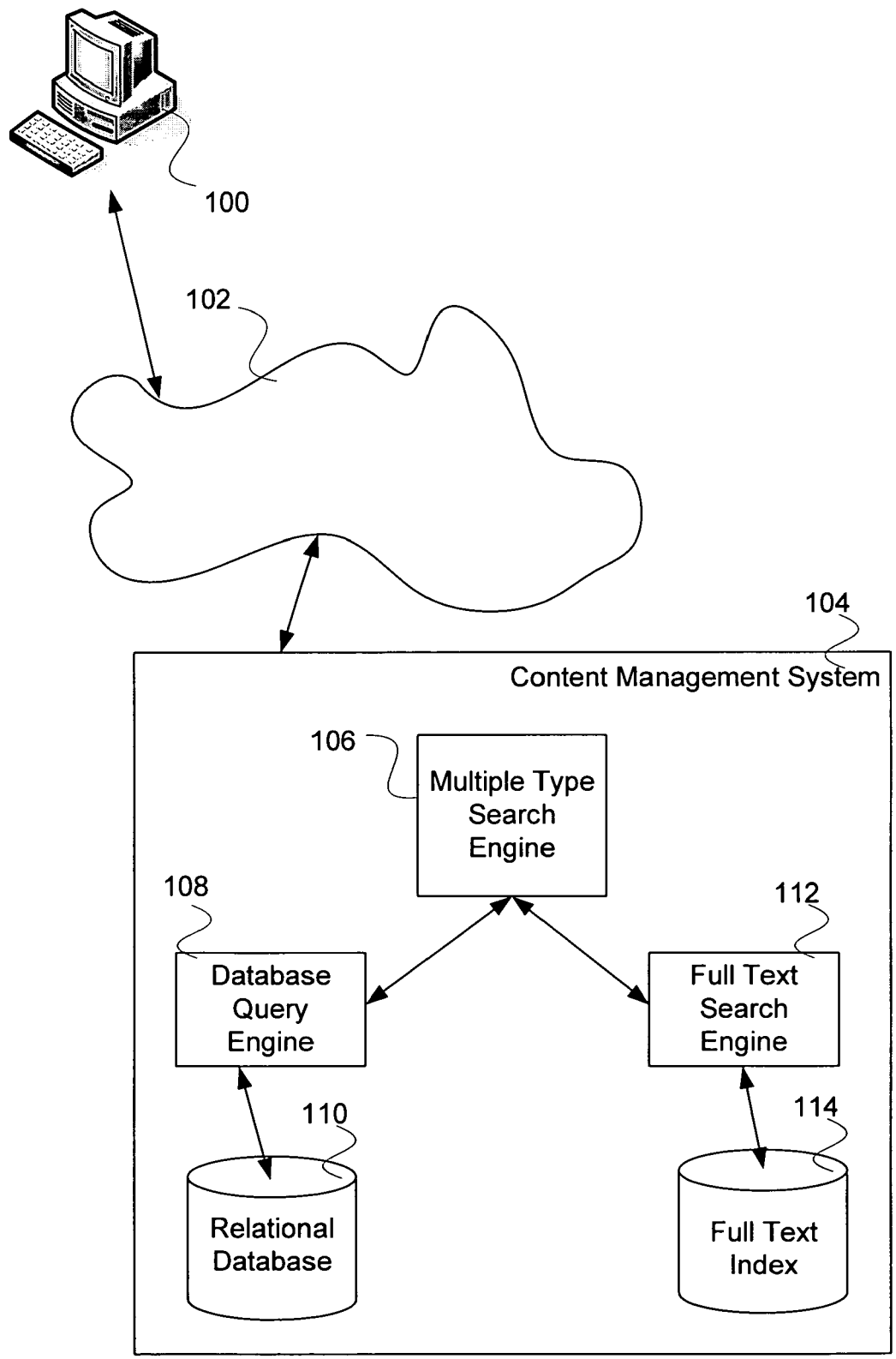
FIG. 1 is a block diagram illustrating an embodiment of a system for translating a query.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Searching stored content is disclosed. Transparent to the user, an abstract query is translated into two or more concrete query languages enabling appropriate searching of different types of objects. A first mapping is created from an object to one or more stored relational database tables. A second mapping is created from the object to an indexer schema. One or both of the following are done: using the first mapping to translate a search request expressed in an abstract query language to a first query language associated with the relational database and using the second mapping to translate the search request a second query language associated with the indexer schema.

In some embodiments, objects in a content management system may comprise one or more different types of objects. For example, a word processing document may be stored as a first type of object and an email message may be stored as an email message type object. A set of content that a user might think of as a single content item may be represented and/or stored by the system as a complex object, potentially including two or more different types of objects. For example, a word processing document and associated reviewer comments may be stored as a complex object comprising a root object used to represent and/or store the text or other primary content of the word processing document and one or more associated comment objects used to represent and/or store comment(s) appended by reviewers to the primary content. Upon receiving a search query, or request, that potentially searches across types, an appropriate translation is made of the query using 1) a first mapping that was created between the model of the objects and a relational database type representation of the objects if full text index searching is not available, and/or 2) a second mapping that was created between the model of the objects and an indexer schema if full text index searching is available. The appropriately translated query is executed and results returned to the user where the translation is transparent to the user.

In some embodiments, upon receiving a search query that potentially searches across types, an assessment is made as to whether it is optimal to search using full text index searching first. If so, a translation is made of the query, or appropriate portion of the original query, using a mapping that was created between the model of the content objects and an indexer schema. The query is executed and results received. The results are then used for a second query, or appropriate portion of the original query, that is a translation made using a mapping that was created between the model of the content objects and a relational database type representation of the content objects. The second query is executed and results received and presented to the user. If it is optimal to search using full text index searching second, then the translations are made so that the relational database type representation mapping is used first for translating the query and the indexer schema mapping is used second for translating the query. The two queries are executed sequentially with the second query operating on the returned results of the first query.

In some embodiments, a parallel set of queries, a sequence of queries, or one or more combinations of parallel and/or sequence of queries are employed to translate an abstract query from a search user into queries appropriate for two or more concrete query languages. The responses to the one or more queries are combined to provide a response to the abstract query of the search user in a manner that is transparent to the search user. For example, a user requests a search for email from 'Marc' that contains the word 'patent' where the results include the recipients to the relevant emails. A first query generated in translating the user query is a relational query to find the object identifier representing the sender 'Marc.' A second query generated in translating the user query is a full-text query to find the email containing 'patent' associated with the object identifier representing the sender 'Marc.' A third query generated in translating the user query is another relational query finding the recipients of the emails from 'Marc' containing the word 'patent.' The complexity of the translation of the abstract user query into the three queries, one full-text and two relational, is hidden from the user.

FIG. 1 is a block diagram illustrating an embodiment of a system for translating a query. In the example shown, a user using computer 100 can query content management system 104. The user using computer 100 can communicate with content management system 104 via network 102. Network 102 comprises one or more of the following: the Internet, a local area network, a wide area network, a wired network, a wireless network, or any other appropriate network for communicating. Content management system 106 includes multiple type search engine 106, database query engine 108, relational database 110, full text search engine 112, and full text index 114.

Multiple type search engine 106 receives the search query from the user. The query is translated appropriately for one or more types of searching using database search engine 108 and/or full text search engine 112. Depending on the objects that the query specifies to search over or depending on the complex relation between the objects that the query specifies to search over, multiple type search engine 106 selects one translation or another, a sequence of translations of the different types, or a translation that includes a combination of parallel and sequential queries, that are executed to return the results to the user's query. Translation of the query uses a mapping from a data model to indexer schema for full text index searching and to relational database tables for database searching.

Database search engine 108 receives the translated search query and executes the query by searching in relational database 110. Results are returned from the search and transferred to multiple type search engine 106. Full text search engine 112 receives translated search query and executes the query by searching in full text index 114. Results are returned from the search and transferred to multiple type search engine 106.

Figure 2:
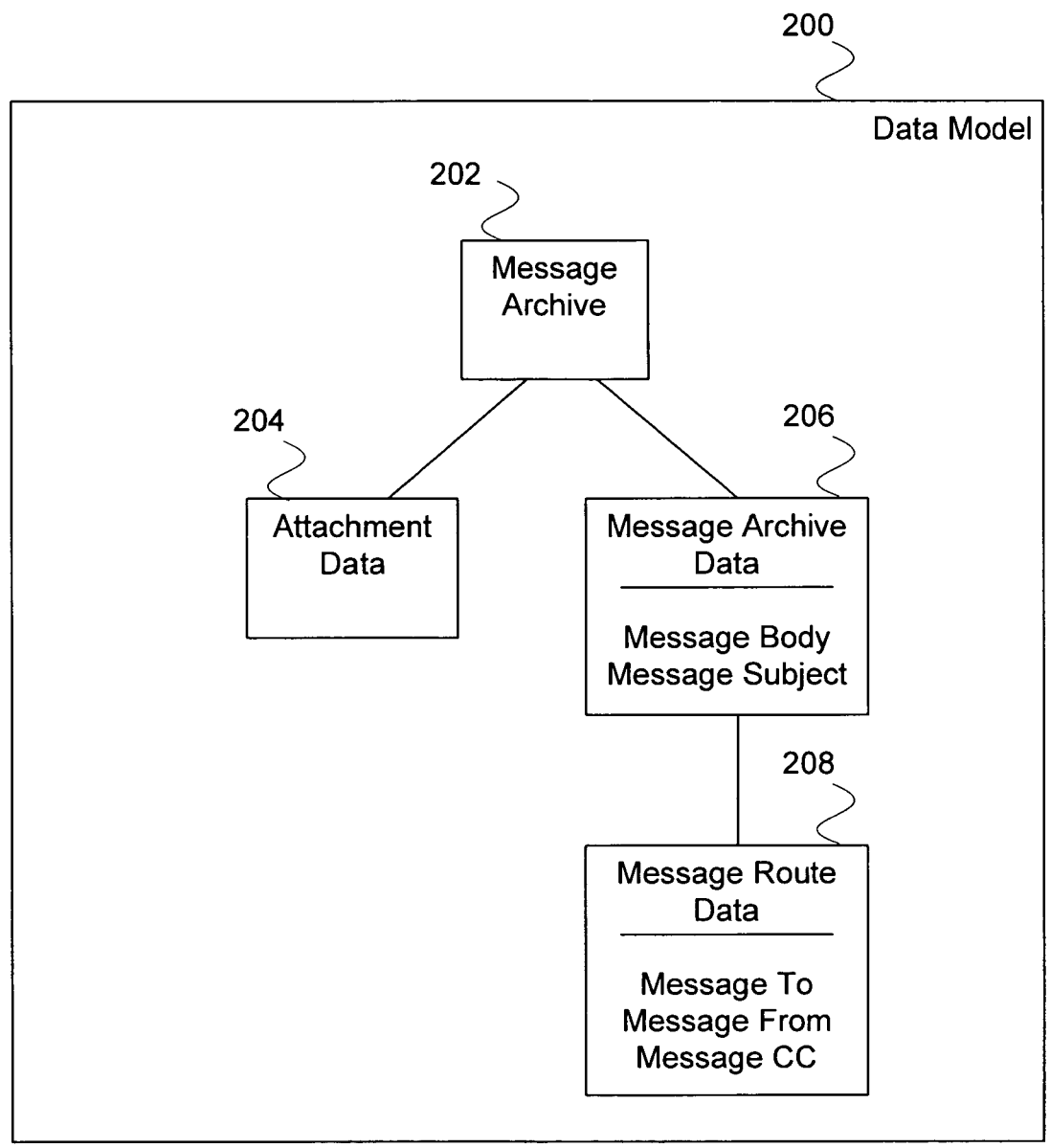
FIG. 2 is a block diagram illustrating an embodiment of a data model.

FIG. 2 is a block diagram illustrating an embodiment of a data model. In some embodiments the data model of FIG. 2 is used to present data structure to a user. In some embodiments, the user comprises a user of an API, developer tool, or other interface provided to facilitate interaction, e.g., by application code written by the user of the API or other interface, with a search service such as multiple type search engine 106 of FIG. 1. In some embodiments, the data model exposes the structure of complex object types to the user without requiring the user to understand, in order to perform or write code configured to perform searches, the specific low level query syntax required to be used to search the various types of objects represented in the model. Instead, as disclosed herein, the user defines and/or configures code to generate a query in an abstract language which is then translated as required, e.g., by a search service such as multiple type search engine 106, into the query or queries required to find the responsive content within the content management system and/or other repository. The model is used in some embodiments to translate the query. Mappings are created between the data model and one or more associated relational database tables on the one hand and between the data model and a full text index schema on the other. In some cases, when there is no need for a particular optimization, for example, the two mappings could be automatically deduced from the model (assuming that the relational structure in the database and the indexer schema are also created using these mapping). These mappings are used to translate the query to the appropriate query for searching the database and/or the full text index. In the example shown, data model 200 comprises an email message with associated attachment and routing information. Data model 200 includes message archive 202, attachment data 204, message data archive 206 with message body and subject, and message route data 208 with message to, message from, message cc. In various embodiments, the objects represented by data model 200 are of the same type or are of different types. For example, attachment data 204 and message archive data 206 can be both full text searchable, full text searchable for only attachment data 204, full text searchable for only message archive data, or not full text searchable.

Figure 3:
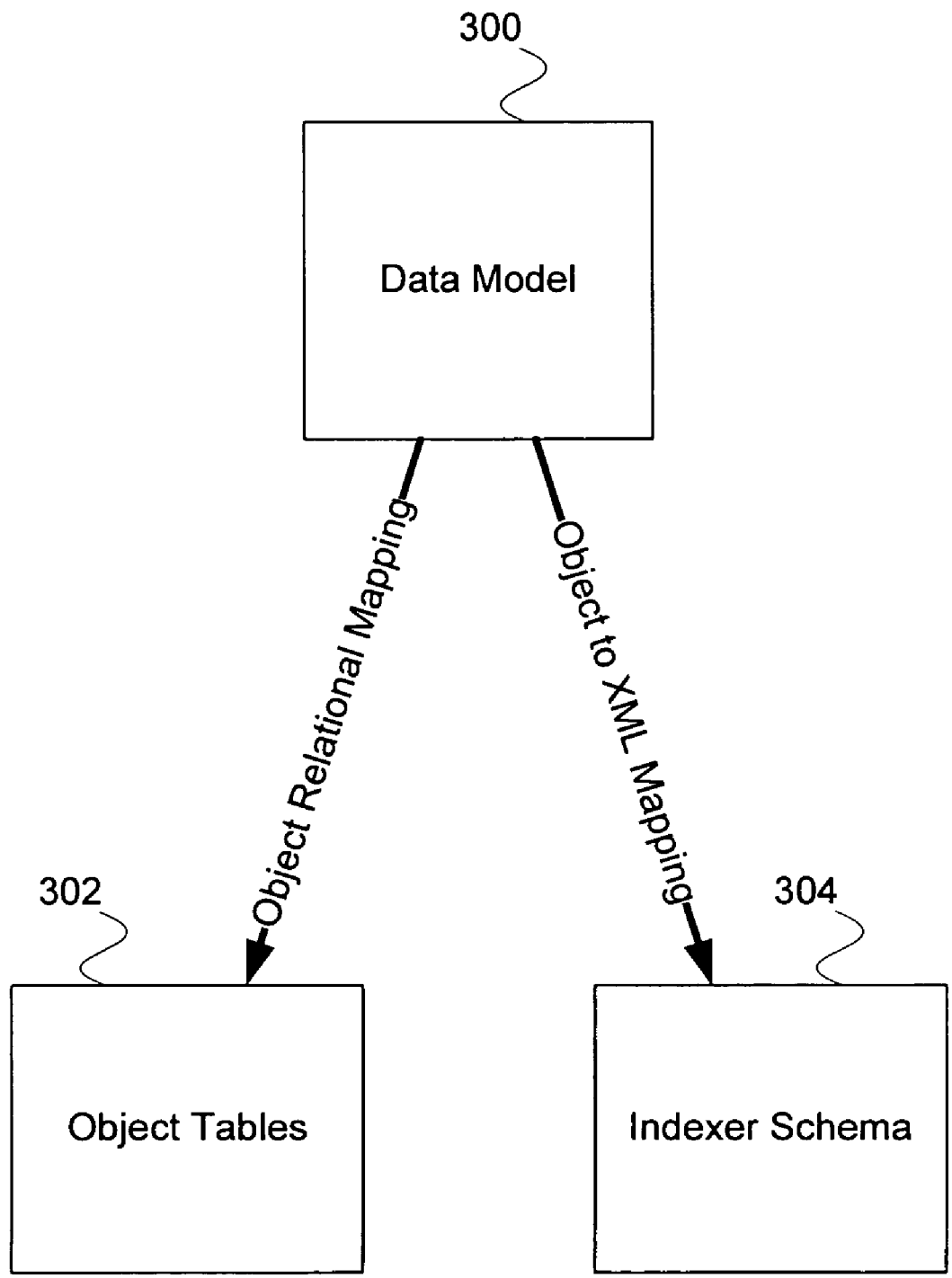
FIG. 3 is a block diagram illustrating en embodiment of mapping.

FIG. 3 is a block diagram illustrating en embodiment of mapping. In some embodiments, data model 300 of FIG. 3 comprises a model such as data model 200 of FIG. 2. In the example shown, an object relational mapping is created between data model 300 and object tables 302 of a relational database. The relational database is used to store pointers to stored objects, relationships between objects, and metadata about objects. The object relational mapping enables a translation of a user input query to a query in a language associated with the relational database. An object to indexer format mapping (e.g., an object to XML mapping) is created between data model 300 and indexer schema 304 of a full text indexing system. The full text indexing system enables full text searching of objects by creating a searchable full text index. The object to indexer format mapping enables a translation of a user input query to a query in a language associated with the full text indexing system.

Figure 4:
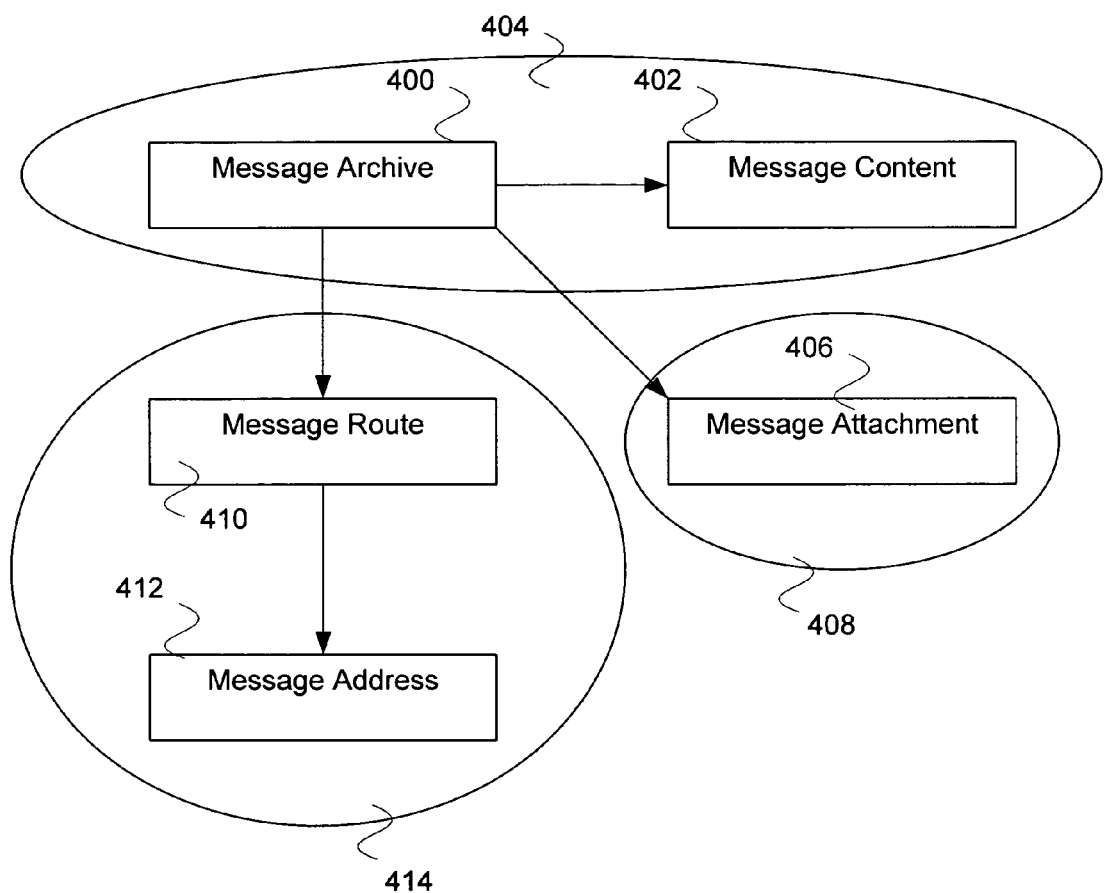
FIG. 4 is a block diagram illustrating an embodiment of an object relational mapping.

FIG. 4 is a block diagram illustrating an embodiment of an object relational mapping. In some embodiments, the mapping corresponds to data model 200 of FIG. 2. In the example shown, within the relational database, message archive 400 is associated with message content 402, message attachment 406, and message route 410. Message route 410 is also associated with message address 412. Mapping 404 indicates a correspondence between a) message archive 400 and message content 402 and b) message archive data 206 of FIG. 2. Mapping 408 indicates a correspondence between message attachment 406 and attachment data 204 of FIG. 2. Mapping 414 indicates a correspondence between a) message route 410 and message address 412 and b) message route data 208 of FIG. 2. The API user is spared from knowing or needing to understand the database structures and required translation for their search query to be properly executed within the system.

Figure 5:
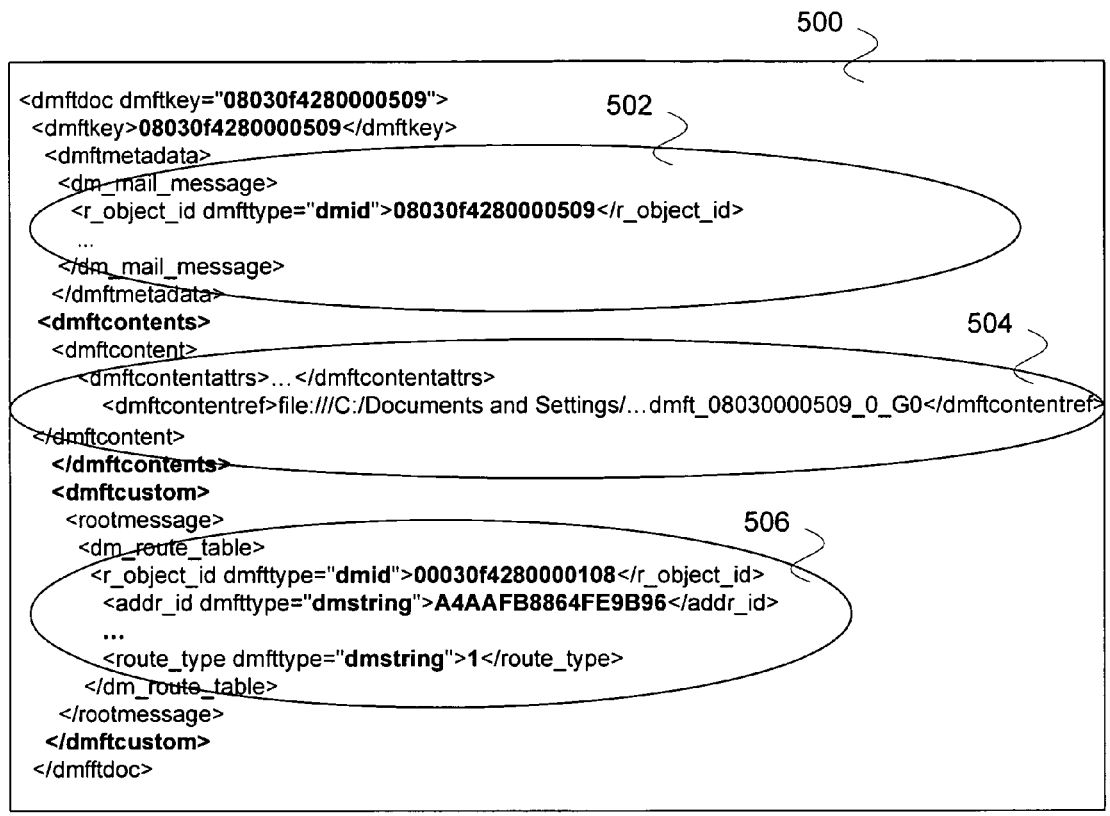
FIG. 5 is a block diagram illustrating an embodiment of an indexer schema mapping.

FIG. 5 is a block diagram illustrating an embodiment of an indexer schema mapping. In some embodiments, the mapping corresponds to data model 200 of FIG. 2. In the example shown, indexer schema 500 includes XML code associated with a full text search system. Mapping 502 indicates a correspondence between XML code and message archive 202 of FIG. 2. Mapping 504 indicates a correspondence between XML code and message archive data 206. Mapping 506 indicates a correspondence between XML code and message route data 208 of FIG. 2. The API user is spared from knowing or needing to understand the XML code and required translation for their search query to be properly executed within the system.

Figure 6:
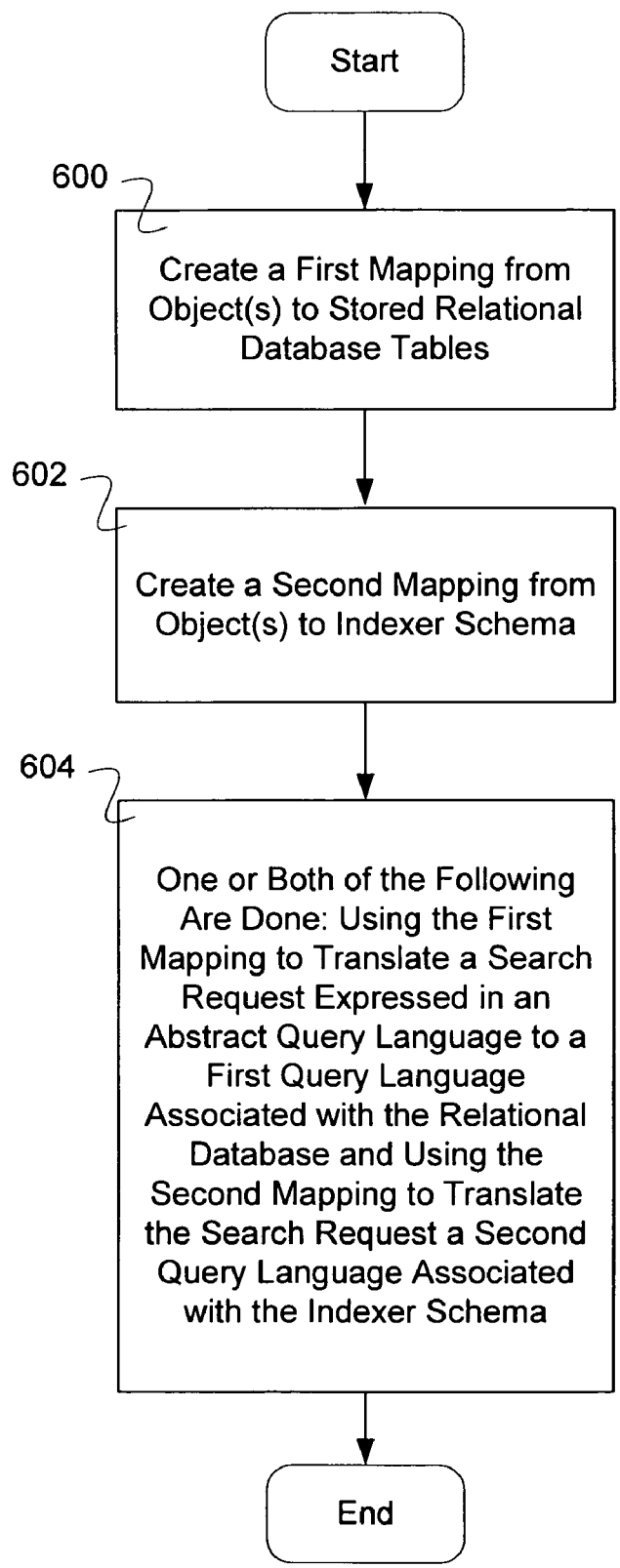
FIG. 6 is a flow diagram illustrating an embodiment of a process for translating a query.

FIG. 6 is a flow diagram illustrating an embodiment of a process for translating a query. In some embodiments, the process of FIG. 6 is executed in multiple type search engine 106 of FIG. 1. In the example shown, in 600 a first mapping is created from object(s) to stored relational database tables. In some embodiments, the relational database tables include metadata that comprise and/or represent content stored in a content management system or other repository. In some embodiments, the metadata may be used by a search service, multiple type search engine 106, to locate content within the repository, e.g., in response to a search query. The relational database tables indicate as applicable relationships between objects as stored in the system. For example, an object representing an archived email message may include data that points to a second object that represents an attachment to the archived email message. In 602, a second mapping is created from object(s) to indexer schema. Indexer schema indicate whether and if so the manner in which the objects are able to be accessed in the full text searching system. In some embodiments, the mapping created at 602 is used to generate and/or update index entries. In 604, one or both of the following are done: using the first mapping to translate a search request expressed in an abstract query language to a first query language associated with the relational database and using the second mapping to translate the search request a second query language associated with the indexer schema.

Figure 7:
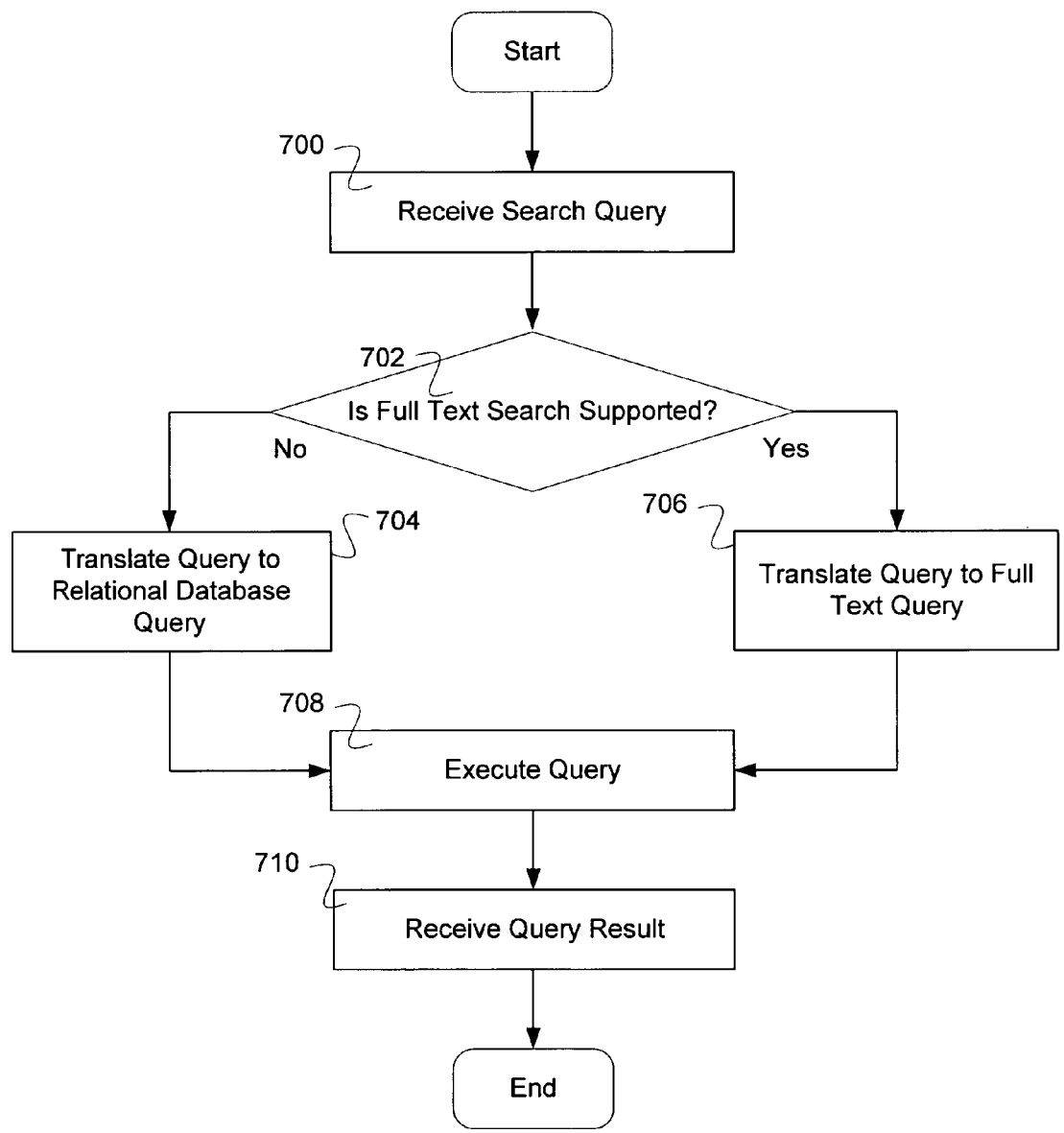
FIG. 7 is a flow diagram illustrating an embodiment of a process for translating a query.

FIG. 7 is a flow diagram illustrating an embodiment of a process for translating a query. In some embodiments, the process of FIG. 7 is used to implement 604 of FIG. 6. In the example shown, in 700 a search query is received. In 702, it is determined if full text search is supported. If it is supported, then in 706, the query is translated to a full text query and control is passed to 708. The translation uses a mapping between a data model and the indexer schema. If it is not supported, then in 704, the query is translated to a relational database query and control is passed to 708. The translation uses a mapping between a data model and the database tables. In 708, the query is executed. In 710, the query results are received.

An example of a search query is to search for all emails with Bob Smith's name in the message body. In this case, let it be the case that full text search is supported of message bodies so that the translation uses a mapping between a data model of an email including the message body and indexer schema to search the message body. The translated query is executed and a search is performed for Bob Smith's name in the message body of an email using the full text searching system. The results are returned to the user who originally made the query.

Figure 8:
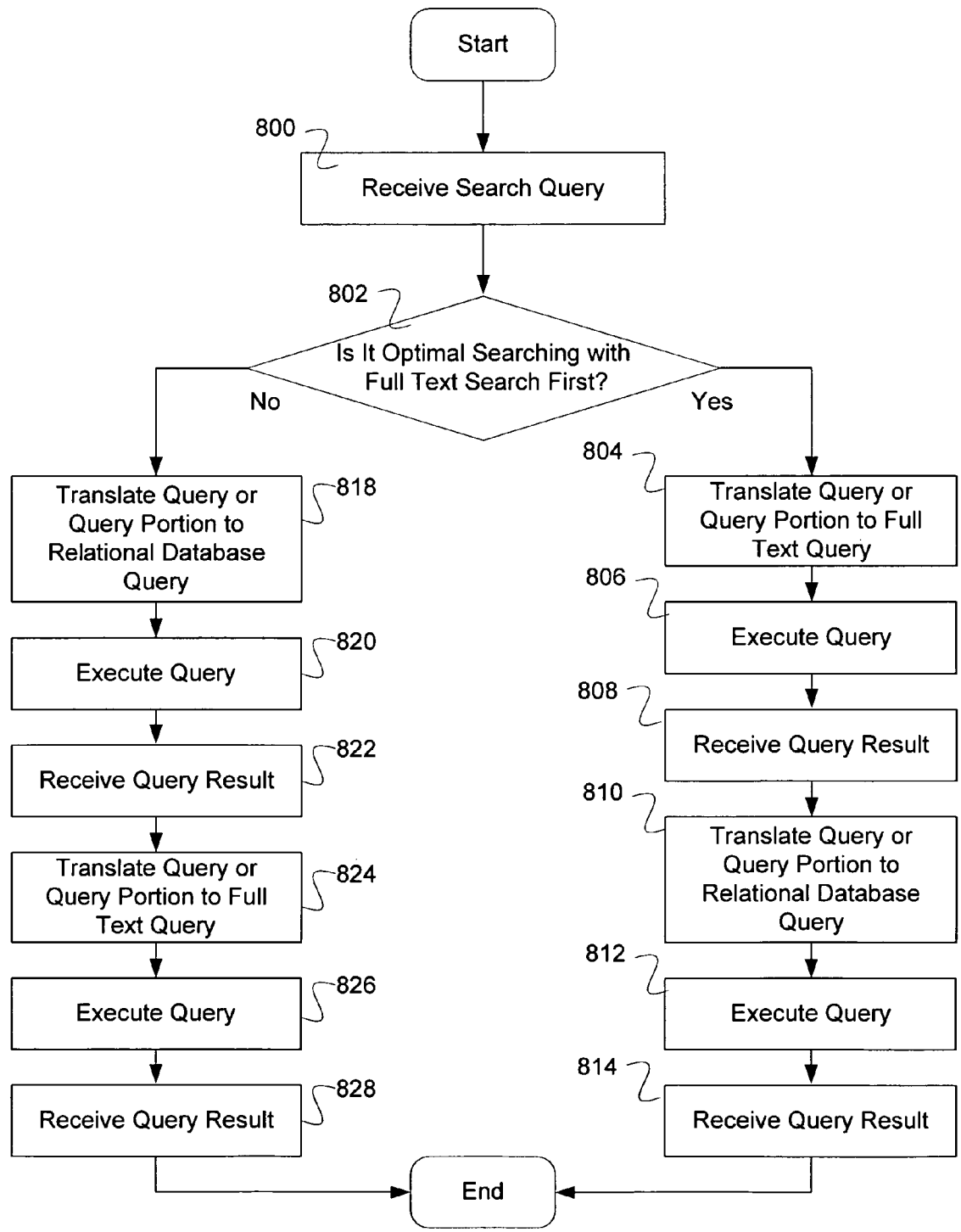
FIG. 8 is a flow diagram illustrating an embodiment of a process for translating a query.

FIG. 8 is a flow diagram illustrating an embodiment of a process for translating a query. In some embodiments, the process of FIG. 8 is used to implement 604 of FIG. 6. In the example shown, in 800 a search query is received. In 802, it is determined if it is optimal searching first with full text search. If it is optimal, then in 804 the query or portion of the query is translated to full text query. The translation uses the mapping between the data model for the complex objects in the query and the indexer schema. In 806, the query is executed. In 808, the query results are returned. In 810, the query or portion of the query is translated to a relational database query. The translation uses a mapping between the data model for the complex objects in the query and relational database tables. In 812, query is executed. In 814, the query results are returned.

If it is not optimal searching first with full text search, then in 818 the query or portion of the query is translated to a relational database query. The translation uses a mapping between the data model for the complex objects in the query and relational database tables. In 820, query is executed. In 822, the query results are returned. In 824 the query or portion of the query is translated to full text query. The translation uses the mapping between the data model for the complex objects in the query and the indexer schema. In 826, the query is executed. In 828, the query results are returned.

An example of a query is to search for Bob Smith's name in an attachment of emails to John Doe. It is determined that the optimal search sequence is to first search for all attachments of emails to John Doe and then to search the attachment for Bob Smith's name. The query is first translated to search using database query for all attachments of emails to John Doe. The query is executed. The results returned. The query is then translated to search the returned results for the appearance of Bob Smith's name using the full text search query. The query is executed and the results returned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of searching stored content comprising:
 receiving a search request;
 determining whether a full text search is better performed prior to a search of one or more stored relational database tables;
 in the event that the full text search is better performed prior to a search of one or more stored relational database tables:
  translating the search request to a full text query;
  executing the full text query;
  translating the search request to a relational database query;
  executing the relational database query, wherein the relational database query is executed after executing the full text query; and
 in the event that the full text search is not better performed prior to the search of one or more store relational database tables:
  translating the search request to the relational database query;
  executing the relational database query;
  translating the search request to the full text query;

executing the full text query, wherein the full text query is executed after executing the relational database query;

wherein automatically determining whether a parallel query comprising another full text query and another relational database query prior to or after the full text query and the relational database query is employed to respond to the search request, and wherein in the event that the parallel query is employed, executing the parallel query.

2. A method as in claim 1, wherein translating the search request is transparent to a search requestor.

3. A method as in claim 1, wherein translating the search request for the full text query using a mapping between a data model for a complex objects in the query and the indexer schema.

4. A method as in claim 3, wherein the object comprises a content management system stored object.

5. A method as in claim 1, wherein translating the search request for the relational database query using a mapping between a data model for a complex objects in the query and relational database tables.

6. A method as in claim 5, wherein the object comprises a content management system stored object.

7. A method as in claim 1, wherein the translating is transparent to a search requestor.

8. A method as in claim 1, wherein translating the search request for the relational database query comprises translating into a first query language associated with a relational database system.

9. A method as in claim 1, wherein translating the search request for the indexer comprises translating into a second query language associated with a full text index search system.

10. A method as in claim 1, wherein the full text query operates on the results of the relational database query.

11. A method as in claim 1, wherein the relational database query operates on the results of the full text query.

12. A method as in claim 1, wherein the relational database query operates on the results of the full text query.

13. A computer program product for searching stored content, the computer program product being embodied in a computer readable storage medium and comprising computer instructions for:

receiving a search request;

determining whether a full text search is better performed prior to a search of one or more stored relational database tables;

in the event that the full text search is better performed prior to a search of one or more stored relational database tables:
translating the search request to a full text query;
executing the full text query;
translating the search request to a relational database query;
executing the relational database query; and in the event that the full text search is not better performed prior to the search of one or more store relational database tables:
translating the search request to the relational database query;
executing the relational database query;
translating the search request to the full text query;
executing the full text query;

wherein automatically determining whether a parallel query comprising another full text query and another relational database query prior to or after the full text query and the relational database query is employed to respond to the search request, and wherein in the event that the parallel query is employed, executing the parallel query.

14. A system of searching stored content comprising:
a processor; and
a memory coupled with the processor, wherein the memory is configured to provide the processor with instructions which when executed cause the processor to:
receive a search request;
determine whether a full text search is better performed prior to a search of one or more stored relational database tables;
in the event that the full text search is better performed prior to a search of one or more stored relational database tables:
translate the search request to a full text query;
execute the full text query;
translate the search request to a relational database query;
execute the relational database query; and
in the event that the full text search is not better performed prior to the search of one or more store relational database tables:
translate the search request to the relational database query;
execute the relational database query;
translate the search request to the full text query;
execute the full text query;
automatically determine whether a parallel query comprising another full text query and another relational database query prior to or after the full text query and the relational database query is employed to respond to the search request, and wherein in the event that the parallel query is employed, execute the parallel query.

15. A system as in claim 14, wherein translating the search request is transparent to a search requestor.

16. A system as in claim 14, wherein translating the search request for the full text query using a mapping between a data model for a complex objects in the query and the indexer schema.

17. A system as in claim 16, wherein the object comprises a content management system stored object.

18. A system as in claim 16, wherein the object comprises a content management system stored object.

19. A system as in claim 14, wherein translating the search request for the relational database query using a mapping between a data model for a complex objects in the query and relational database tables.

20. A system as in claim 14, wherein the translating is transparent to a search requestor and the translating comprises translating the search request for the relational database query into a first query language associated with a relational database system.

21. A system as in claim 14, wherein translating the search request for the relational database query comprises translating into a first query language is associated with a relational database system.

22. A system as in claim 14, wherein translating the search request for the indexer comprises translating into a second query language associated with a full text index search system.

23. A system as in claim 14, wherein the full text query operates on the results of the relational database query.

* * * * *